United States Patent [19]
Haraguchi

[11] Patent Number: 5,964,529
[45] Date of Patent: Oct. 12, 1999

[54] TEMPERATURE DISTRIBUTION MEASURING INSTRUMENT

[75] Inventor: Tatsuo Haraguchi, Saitama-ken, Japan

[73] Assignee: Zexel Corp., Tokyo, Japan

[21] Appl. No.: 09/019,302

[22] Filed: Feb. 5, 1998

[30] Foreign Application Priority Data

Feb. 19, 1997 [JP] Japan ..................... 9-035249

[51] Int. Cl.$^6$ ..................... B60H 1/00
[52] U.S. Cl. ..................... 374/124; 374/130; 374/137
[58] Field of Search ..................... 374/124, 130, 374/137

[56] References Cited

U.S. PATENT DOCUMENTS 5,567,052  10/1996  Yoshiike et al. ............. 374/124
5,577,840  11/1996  Tomita ........................ 374/130

*Primary Examiner*—Randy W. Gibson
*Attorney, Agent, or Firm*—Kanesaka & Takeuchi

[57] ABSTRACT

A temperature distribution measuring instrument comprises an inner cylinder having slits and rotating around an infrared sensor, and a rotating outer cylinder having a plurality of slit blocks, each consisting of a plurality of slits. The slit blocks of the outer cylinder are arranged at intervals of a predetermined angle and shifted from one another by a predetermined height in a direction of the length of the outer cylinder, and infrared rays passing through a slit in the outer cylinder and a slit in the inner cylinder are converged at the infrared sensor.

2 Claims, 12 Drawing Sheets

TEMPERATURE DISTRIBUTION MEASURING INSTRUMENT

BACKGROUND OF THE INVENTION

1. Field of the Invention

This invention relates to a temperature distribution measuring instrument for obtaining a thermal image of an object by detecting infrared rays from the object such as a human body. More specifically, it relates to a temperature distribution measuring instrument for obtaining a two-dimensional thermal image of an object to be measured using a single-element type infrared sensor.

2. Description of the Prior Art

Figure 17:
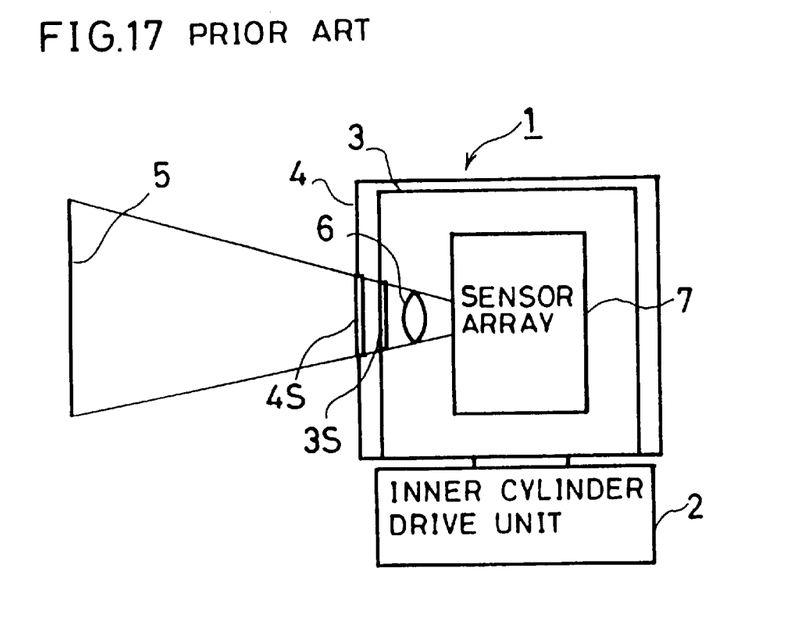
FIG. 17 is a structural diagram of a temperature distribution measuring instrument of the prior art.
Figure 18A:
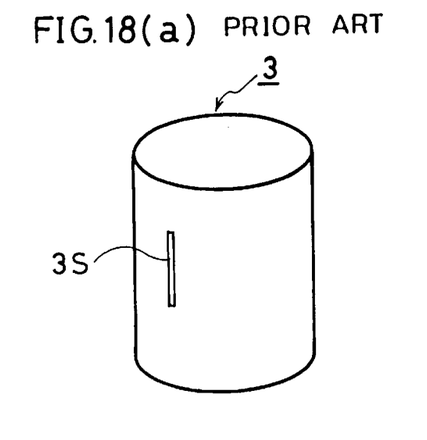
FIGS. 18(a) to 18(c) are perspective views of an inner cylinder and an outer cylinder and a diagram showing the structure of a sensor array of the temperature distribution measuring instrument of the prior art.
Figure 18B:
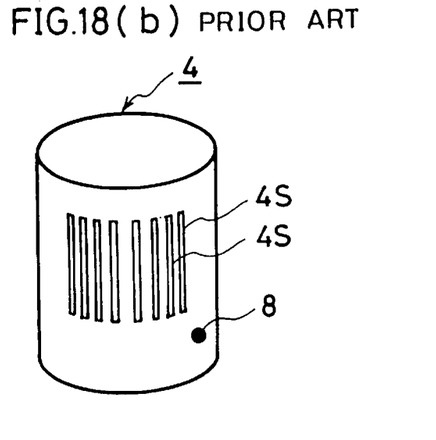
Figure 18C:
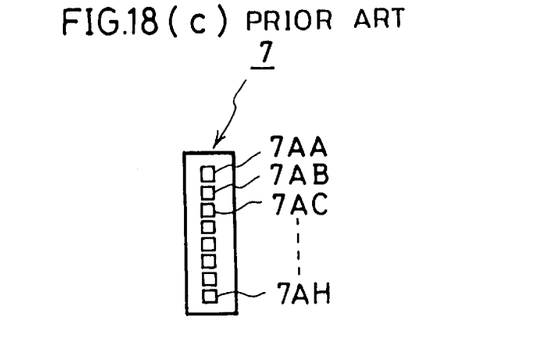
Figure 19:
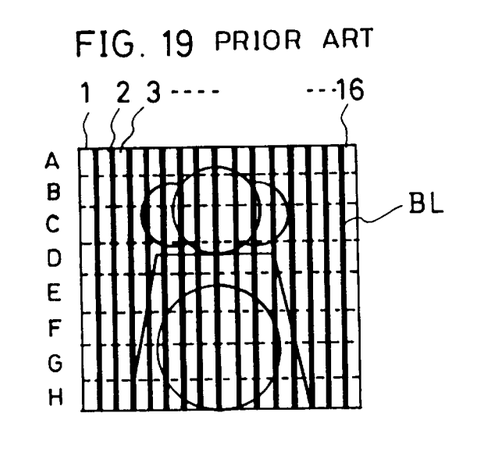
FIG. 19 is a diagram showing an example of a thermal image obtained by the temperature distribution measuring instrument of the prior art.

A temperature distribution measuring instrument 1 of the prior art which uses an infrared sensor array for detecting infrared rays from an object to be measured, such as a human body, converges infrared rays from the object at a sensor array 7 by a condenser lens 6 when a slit 3s formed in a side portion of an inner cylinder 3 rotated by an inner cylinder drive unit 2 is aligned with one of a plurality of slits 4s formed in a side portion of an outer cylinder 4 and measures the temperature distribution of the object 5 as shown in FIG. 17. FIGS. 18(a) and 18(b) are perspective views of the inner cylinder 3 and the outer cylinder 4, respectively. Out of infrared rays passing through 16 slits 4s in the outer cylinder 4, only infrared rays which are aligned with the slit 3s in the rotating inner cylinder 3 are input into the sensor array 7 as shown in FIG. 18(c), and a voltage corresponding to the intensity of the infrared rays from the object 5 is output from the infrared sensors 7A (7AA to 7AE) of the sensor array 7. For the temperature compensation of the output of the infrared sensor array 7, as shown in FIG. 18(b), a thermister 8 is provided on a lower end portion of the side of the inner cylinder 3. The slit 3s in the rotating inner cylinder has chopping and scanning functions to transmit and cut off input infrared rays. Infrared rays from the object 5 are input into the sensor array 7 and cut off repeatedly at a frequency (chopping frequency) corresponding to the rotating speed of the inner cylinder 3. A thermal image of the object which is divided into 16 regions corresponding to 16 slits in the outer cylinder 4 in a longitudinal direction and 7 regions A to H corresponding to 7 infrared sensors 7A of the sensor array 7 in a transverse direction as shown in FIG. 19 is obtained. In the figure, black vertical line regions BL are regions where the slit in the inner cylinder does not overlap with the slits in the outer cylinders during the rotation of the inner cylinder.

In the above array type infrared sensor used in the prior art, there have been great differences in performance among infrared sensor elements and it has been difficult to manufacture a sensor array having uniform sensitivity among sensor elements. Therefore, as there have been differences in sensitivity among sensors in a temperature distribution measuring instrument using an ordinary sensor array, it has been difficult to obtain an accurate thermal image unless sensitivity was corrected for each sensor. Further, since it has been difficult to provide uniform performance and high sensitivity to the sensor elements of a sensor array, the temperature distribution measuring instrument of the prior art could not be reduced in size.

SUMMARY OF THE INVENTION

In view of the above problems of the prior art, it is an object of the present invention to provide a temperature distribution measuring instrument which has high measurement accuracy and can be reduced in size, using a single element type infrared sensor.

According to a first aspect of the present invention, there is provided a temperature distribution measuring instrument which comprises a single element type infrared sensor for detecting infrared rays from an object to be measured, an inner cylinder having a center axis parallel to the detection surface of the infrared sensor and two slits in the side portion and rotating around the infrared sensor, and a rotating outer cylinder arranged around the inner cylinder coaxially and having a plurality of slit blocks in the side portion, each consisting of a plurality of slits having a smaller length than the slits of the inner cylinder, wherein the slit blocks of the outer cylinder are arranged at intervals of a predetermined angle and shifted from one another by a predetermined height in a direction of the length of the outer cylinder, and the inner cylinder and the outer cylinder are rotated together to converge at the infrared sensor infrared rays passing through a slit in the outer cylinder and a slit in the inner cylinder.

According to a second aspect of the present invention, there is provided a temperature distribution measuring instrument which comprises a single element type infrared sensor for detecting infrared rays from an object to be measured, an inner cylinder having a center axis parallel to the detection surface of the infrared sensor and a slit in the side portion and rotating around the infrared sensor, a rotating outer cylinder arranged around the inner cylinder coaxially and having a plurality of slits in the side portion, and an intermediate cylinder coaxial with the outer cylinder and the inner cylinder, arranged between the outer cylinder and the inner cylinder and having in the side portion a plurality of slits having a smaller length than the slits in the inner cylinder and the outer cylinder, wherein the slits in the intermediate cylinder are arranged at intervals of a predetermined angle and shifted from one another by a predetermined height in a direction of the length of the intermediate cylinder, and the inner cylinder and the intermediate cylinder are rotated together to converge at the infrared sensor infrared rays passing through slits in the outer cylinder, the intermediate cylinder and the inner cylinder.

The above and other objectives, features and advantages of the present invention will become more apparent from the following description when taken in conjunction with the accompanying drawings.

DETAILED DESCRIPTION OF THE PREFERRED EMBODIMENTS

Preferred embodiments of the present invention will be described hereinunder with reference to the accompanying drawings.

In the following description, the same or corresponding elements as in the prior art are given the same reference symbols.

Embodiment 1

Figure 1:
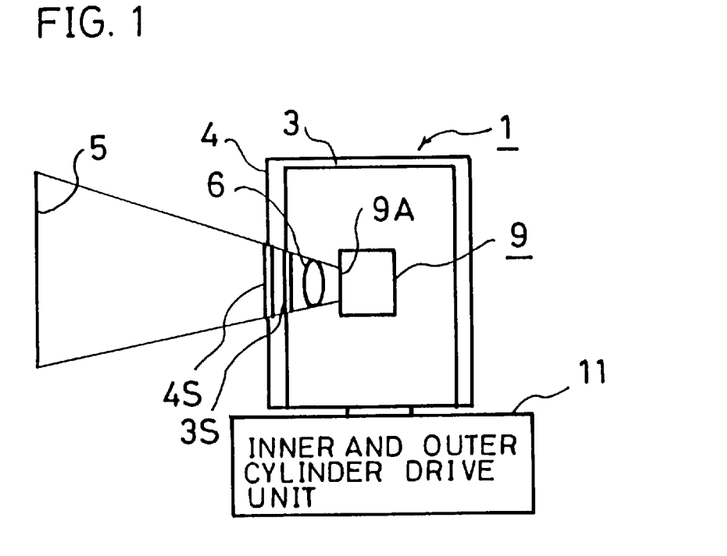
FIG. 1 is a structural diagram of a temperature distribution measuring instrument according to Embodiment 1 of the present invention.
Figure 2A:
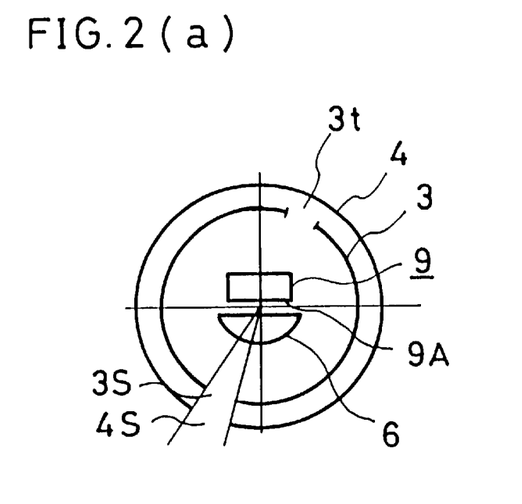
FIGS. 2(a) and 2(b) are diagrams showing the arrangement of an infrared sensor according to Embodiment 1 of the present invention.
Figure 2B:
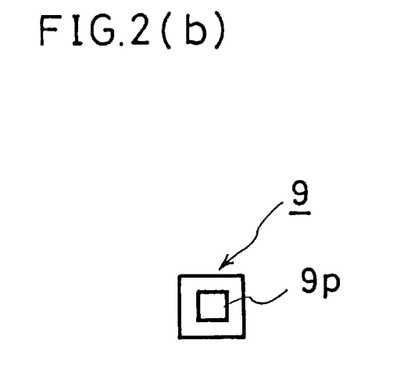

FIG. 1 is a diagram showing the configuration of a temperature distribution measuring instrument according to Embodiment 1 of the present invention. The temperature distribution measuring instrument 1 comprises an infrared sensor 9 consisting of single element type pyroelectric elements, an inner cylinder 3 having two slits 3s and 3t parallel to the detection surface 9A of the infrared sensor 9 and rotating around the infrared sensor 9, an outer cylinder 4 coaxial with the inner cylinder 3, located outside the inner cylinder 3 and having a plurality of slits, a condenser lens 6 for converging infrared rays from an object 5 to be measured when one of the plurality of slits 4s formed in the side portion of the outer cylinder 4 is aligned with one of the slit 3s and 3t formed in the side portion of the inner cylinder 3, and an inner and outer cylinder drive unit 11 for rotating the inner cylinder 3 and the outer cylinder 4. The center of the detection surface 9A of the infrared sensor 9 coincides with the center axis of the inner cylinder 3 and the outer cylinder 4 as shown in FIG. 2(a). The slits 3s and 3t have the same shape and are formed in the side portion of the inner cylinder 3 on the opposite sides. FIG. 2(b) shows the detection surface 9A of the infrared sensor 9. A single element type pyroelectric element 9P is arranged at the center of the detection surface 9A.

Figure 3A:
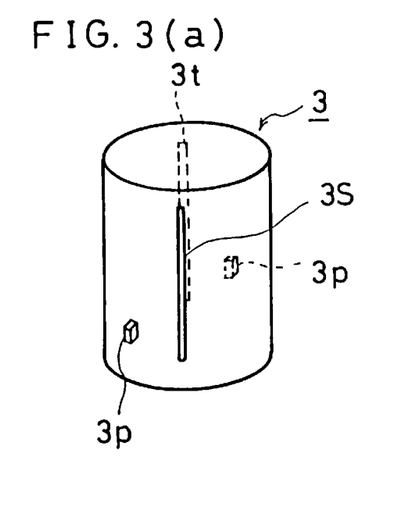
FIGS. 3(a) and 3(b) are perspective views of an inner cylinder and an outer cylinder according to Embodiment 1 of the present invention, respectively.
Figure 3B:
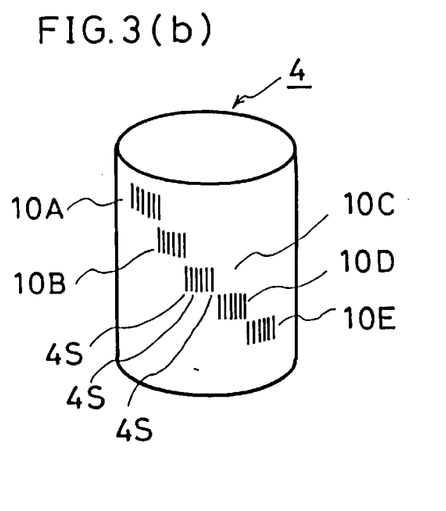
Figure 4:
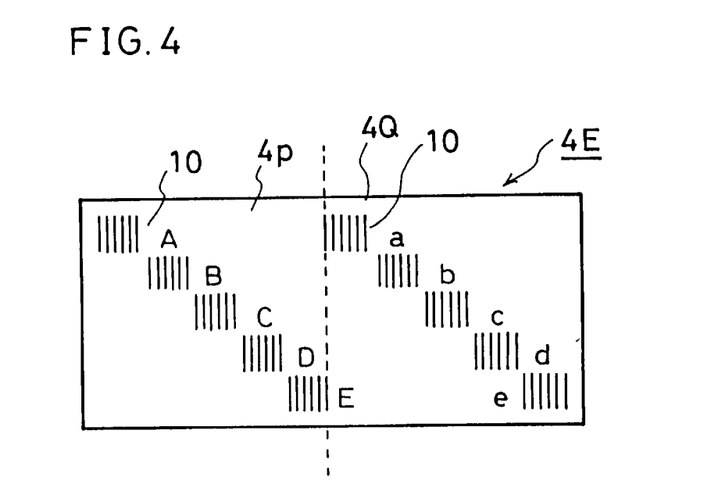
FIG. 4 is a development of the side portion of the outer cylinder according to Embodiment 1 of the present invention.

FIGS. 3(a) and 3(b) are perspective views of the inner cylinder 3 and the outer cylinder 4, respectively. The inner cylinder 3 has two slit 3s and 3t and the outer cylinder 4 has 5 slit blocks 10A to 10E and unshown 5 slit blocks 10a to 10e formed in a side portion on a side opposite to the slit blocks 10 (10A to 10E), each consisting of 6 slits 4s equal to the number N of lateral divisions of the object 5. The number of one set of the above slit blocks 10 (5 in this embodiment) is equal to the number M of longitudinal divisions of the object 5. The length of each of the slits 4s of the slit blocks 10 is smaller than a length obtained by dividing the length of the outer cylinder 4 by the number of one set of the slit blocks, and the slit blocks 10 are arranged obliquely downward from an upper portion to a lower portion of the side of the outer cylinder 4. For example, a slit block 10B adjacent to a slit block 10A located at a top portion of the side of the outer cylinder 4 is located at a position obtained by rotating the slit block 10A around the center axis of the outer cylinder 4 at a predetermined angle and shifting it by a predetermined height in a direction of the height of the outer cylinder 4 as shown in FIG. 3(b). The relationship between the slit block 10B and a slit block 10C adjacent to the slit block 10B is the same as above. That is, when the side portion 4E of the outer cylinder 4 is developed, the arrangement of the slit blocks 10A to 10E is such as shown in FIG. 4 that the above slit blocks 10A, 10B, . . . , 10E are arranged sequentially from the upper portion of the outer cylinder 4 on a diagonal line in a right half portion of the side portion 4E. Slit blocks 10a, 10b, . . . , 10e are arranged sequentially on a diagonal line in a left half of the side portion 4E as in the right half of the side portion 4E.

Figure 5A:
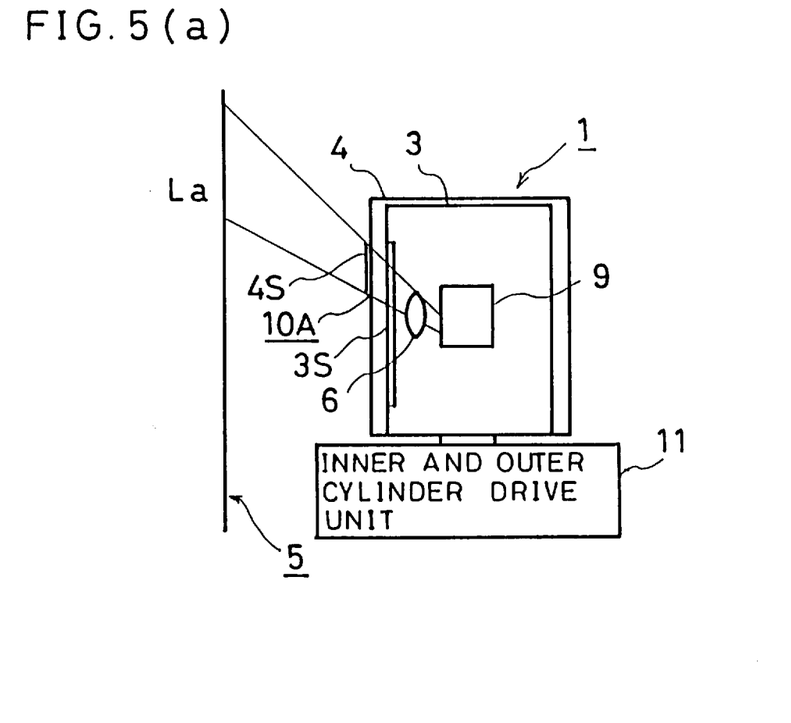
FIGS. 5(a) and 5(b) are diagrams showing the relationship between an object to be measured and slit blocks according to Embodiment 1 of the present invention.
Figure 5B:
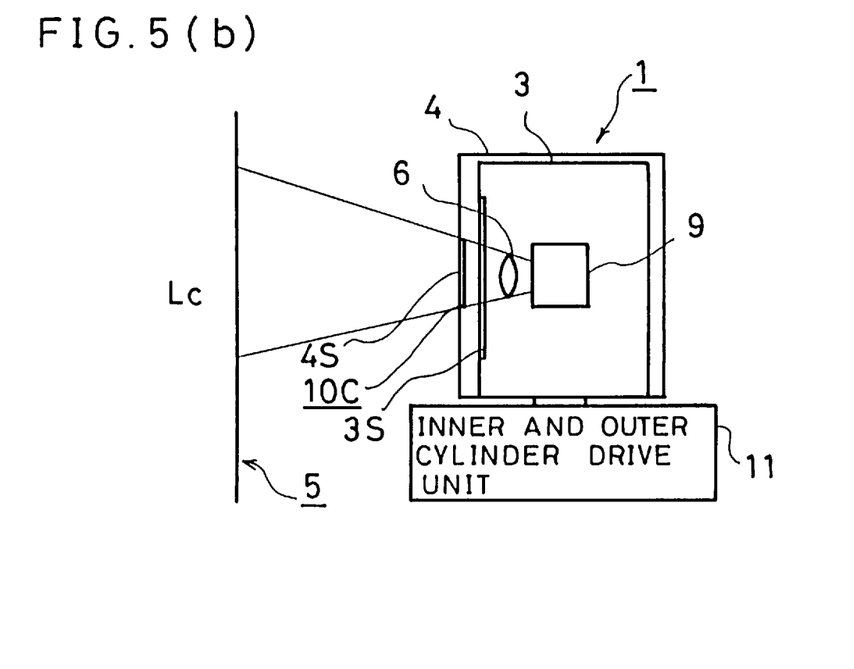

A description is subsequently given of the operation of the temperature distribution measuring instrument 1. FIGS. 5(a) and 5(b) show the relationship between the object 5 and the slit blocks. The outer cylinder 4 and the inner cylinder 3 are rotated by the inner and outer cylinder drive unit 11, infrared rays from an upper region La of the object 5 are converged at the infrared sensor 9 through the condenser lens 6 when one of the slits 4s of the slit block 10A of the outer cylinder 4 is aligned with the slit 3s of the inner cylinder 3 as shown in FIG. 5(a). Infrared rays from a center region Lc of the object 5 are converged at the infrared sensor 9 through the condenser lens 6 when one of the sits 4s of the slit block 10C of the outer cylinder 4 is aligned with the slit 3s of the inner cylinder 3 as shown in FIG. 5(b). Since infrared rays from other regions of the object 5 are also converged at the infrared sensor 9 when other slit blocks B, D and E are aligned with the slit 3s of the inner cylinder 3, respectively, a thermal image of the object 5 which is divided into 5 A to E vertically is obtained.

Figure 6A:
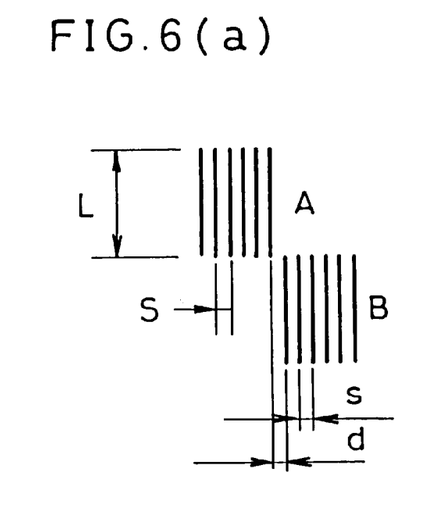
FIGS. 6(a) to 6(c) are structural diagrams of slit blocks according to Embodiment 1 of the present invention.
Figure 6B:
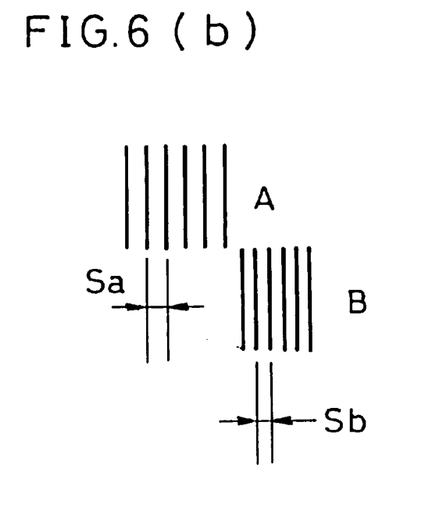
Figure 6C:
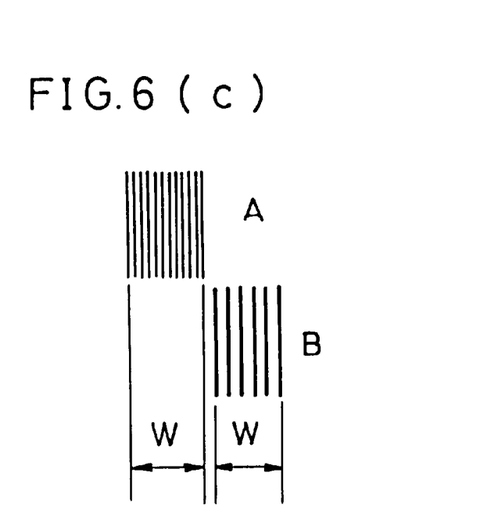
Figure 7:
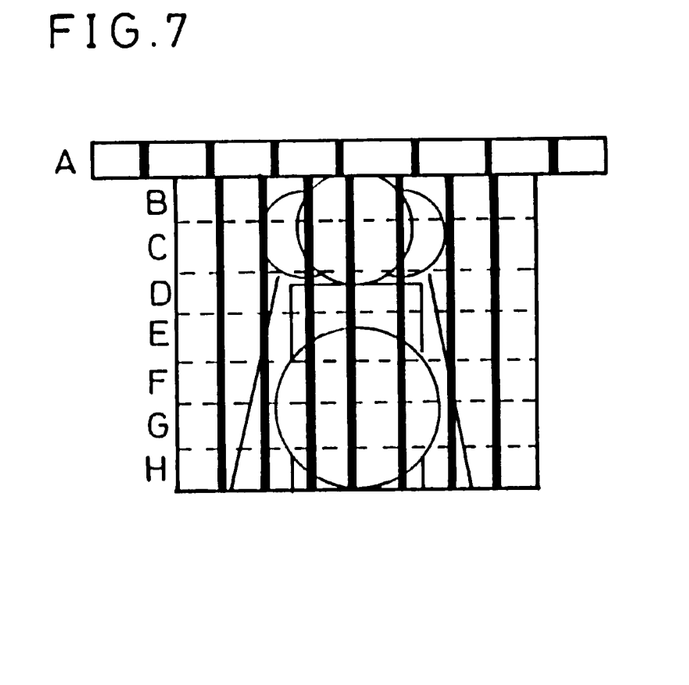
FIG. 7 is a diagram showing a measurement example of a thermal image according to Embodiment 1 of the present invention.
Figure 8:
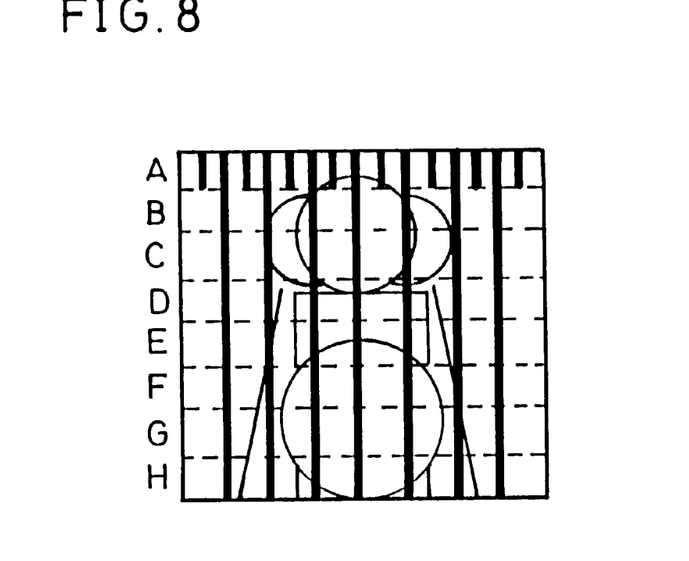
FIG. 8 is a diagram showing another measurement example of a thermal image according to Embodiment 1 of the present invention.

The positional relationships among the slit blocks 10 in the outer cylinder 4 and the relationship between the width and interval of the slits 4s and a thermal image obtained by the temperature distribution measuring instrument 1 are described hereinunder. FIG. 6(a) shows the configuration of the slit blocks 10. By aligning a lower end of the slit block 10A with an upper end of the slit block 10B, the vertical measurement range of the object 5 can be prevented from being broken. The interval d between the slit blocks 10 does not have to be the same as the interval s between the slits $4s$ because a switching operation for the slit blocks 10 by a ratchet unit or the like which will be described hereinafter is required. When the widths of the slits $4s$ of the slit blocks 10A and 10B are fixed, the slit interval sa of the slit block 10A is made larger than the slit interval sb of the slit block 10B, and scanning is carried out at a fixed rotating speed (fixed chopping frequency) as shown in FIG. 6(b), the obtained thermal image is such as shown in FIG. 7 that the measurement range (to be referred to as "portion A" hereinafter) of the slit block 10A is widened in a horizontal direction. When the block width W of the slit block 10A remains unchanged and the number of slits is increased as shown in FIG. 6(c), the obtained thermal image is such as shown in FIG. 8 that there are a large number of data in the same measurement range, thereby making possible the accurate measurement of the portion A. When the number of slits of the slit block 10B is regular and the rotating speed based on this regular number of slits is R, there are a larger number of slits in the portion A than other portions. Therefore, in order to fix the chopping frequencies of the portions A and B (the measurement range of the slit block 10B), the rotating speed r of the portion A must be made smaller than the above regular rotating speed R or the slit width of the portion A must be changed.

It is needless to say that the widening of the measurement range and the increase of measurement data can be carried out likewise for any slit blocks 10 (10A to 10E).

Figure 9:
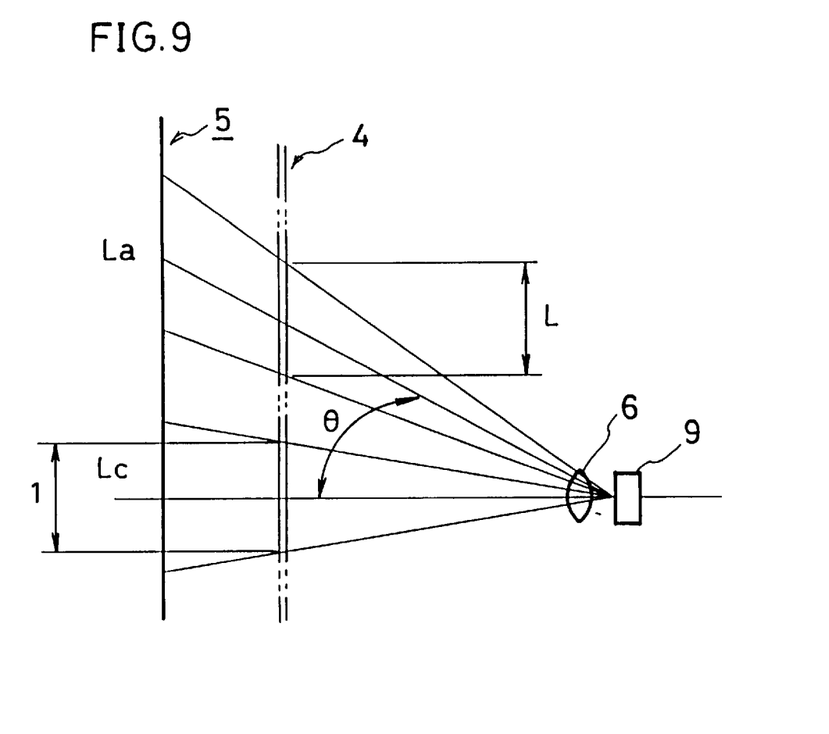
FIG. 9 is a diagram showing the relationship between the object and the slit length according to Embodiment 1 of the present invention.

When the slit lengths of the above slit blocks 10A to 10E are the same, the lengths of portions (to be referred to as "measurement range" hereinafter) exposed to infrared rays from the object 5 of the slit blocks 10A to 10E are different. FIG. 9 shows the measurement ranges of the slit block 10A at an upper portion of the cylinder and the slit block 10C at a center portion of the cylinder. The center of the slit block C is within the plane passing the installation position of the condenser lens 6 (infrared sensor 9) at a center portion of the cylinder. When the center of the slit block 10A is located at an angle θ above that plane, the measurement range $L_a$ of the slit block 10A is obtained from the equation $L_a = L_c/(\cos θ)$ ($L_c$ represents the measurement range of the slit block 10C). Therefore, to make the measurement ranges of the object 5 fixed irrespective of the incident angle θ, the slit length of a slit block at an angle θ from the center must satisfy the equation $L = L_c \cdot (\cos θ)$.

By changing the slit lengths of the slit blocks 10A to 10E, the measurement range of each slit block can be changed and weighted.

Figure 10:
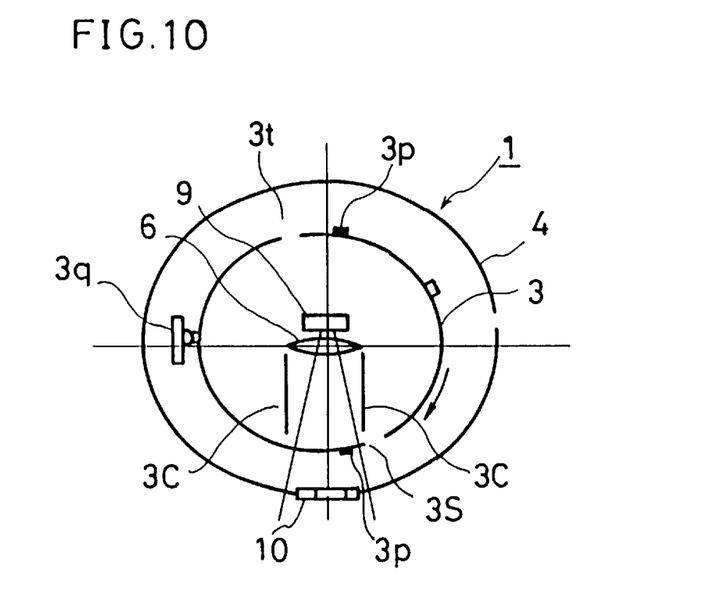
FIG. 10 is a diagram for explaining the operation of the temperature distribution measuring instrument according to Embodiment 1 of the present invention.
Figure 11:
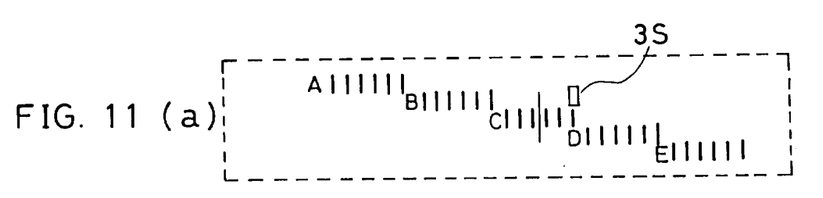
FIGS. 11(a) to 11(e) are diagrams for explaining the movement of a slit according to Embodiment 1 of the present invention.

The rotations of the inner cylinder 3 and the outer cylinder 4 of the temperature distribution measuring instrument 1 and the positional relationship of the slits are described with reference to FIG. 10 and FIG. 11. As shown in FIG. 10, suppose that the slit block 10C of the outer cylinder 4 is located in front of the infrared sensor 9. A microswitch $3q$ for detecting the rotation position of the inner cylinder 3 is provided between the inner cylinder 3 and the outer cylinder 4 at 90° from the front of the infrared sensor 9. The microswitch $3q$ outputs a position signal when it contacts projections $3p$ provided below the slits $3s$ and $3t$ of the inner cylinder 3.

The inner cylinder 3 rotates clockwise, and the slit $3s$ of the inner cylinder 3 is first aligned with a slit at a right end of the slit block 10C of the outer cylinder 4 as shown in FIG. 11(a), then with other slits of the slit block 10C sequentially along with the rotation of the inner cylinder 3 and reaches a left end of the slit block 10C as shown in FIGS. 11(b) and 11(c). Thus, a thermal image of a row C formed by the slit block 10C is obtained (see FIG. 7 or 8).

Although the inner cylinder 3 keeps rotating, infrared rays are prevented from being input into the infrared sensor 9 by a cut-off plate 3C provided internal to the inner plate 3 even when the slit $3s$ of the inner cylinder 3 is aligned with a slit of the slit block 10B adjacent to the slit block 10C. The inner cylinder 3 completes a half turn, the projecting $3p$ of the inner cylinder 3 presses in the microswitch $3q$ as shown in FIG. 10, a block switch signal is sent from the microswitch $3q$ to the inner and outer cylinder drive means 11, the outer cylinder 4 rotates clockwise at a predetermined angle as shown in FIG. 11(d), and the slit block 10D of the outer cylinder 4 stops in front of the infrared sensor 9. As shown in FIG. 11(e), a slit $3t$ formed in a side opposite to the slit $3s$ of the inner cylinder 3 appears on the input side of the infrared sensor 9 to let incident infrared rays passing through the slits of the slit block 10D from the right end. Thus, thermal images of rows A to E in a vertical direction are obtained by the movement of the slit over the slit blocks sequentially. When two sets of the slit blocks (A to E and a to e) are formed in the outer cylinder 4 at an interval of 180° as shown in FIG. 4, thermal images of rows A to E in a vertical direction can be obtained continuously because the slit blocks 10a to 10e are positioned in front of the infrared sensor 9 sequentially after the completion of detection by the slit block 10E.

According to this embodiment, since a two-dimensional thermal image of the object 5 can be obtained using the single element type infrared sensor 9, the temperature distribution measuring instrument can be reduced in size.

While the temperature distribution measuring instrument comprises the inner cylinder 3 having two slits and the outer cylinder 4 having a plurality of slit blocks 10 in the above Embodiment 1 of the present invention, the inner cylinder 3 and the outer cylinder 4 may be exchanged. In this case, the rotation unit must be changed such that the inner cylinder should be rotated at a predetermined angle each time the outer cylinder having two slits makes a half turn.

While the number of the slits in the inner cylinder is 2 in the above embodiment, it may be one if the inner cylinder 3 rotates reversely each time it makes a, half turn. Further, if the outer cylinder 4 rotates reversely after the completion of detection by the slit block 10E, one set of the slit blocks 10A to 10E of the outer cylinder 4 will suffice. It is needless to say that, in all the above cases, the order of temperature data received is different from that of the above embodiment.

Embodiment 2

In the temperature distribution measuring instrument of Embodiment 1, an intermediate cylinder 12 whose center and center axis coincide with the center and the center axis of the inner cylinder 3 and the outer cylinder 4, respectively, is provided between the inner cylinder 3 and the outer cylinder 4, the following slits are formed in the side portions of these cylinders, and the inner cylinder 3 and the intermediate cylinder 12 are rotated, thereby making it possible to further improve the resolution of the temperature distribution measuring instrument. In this Embodiment 2, the inner and outer cylinder drive unit 11 rotates both the inner cylinder 3 and the intermediate cylinder 12.

Figure 12A:
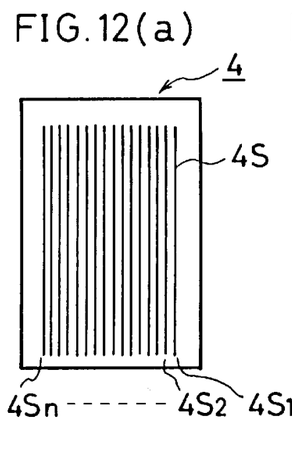
FIGS. 12(a) to 12(c) are front views of an outer cylinder, an intermediate cylinder and an inner cylinder according to Embodiment 2 of the present invention, respectively.
Figure 12B:
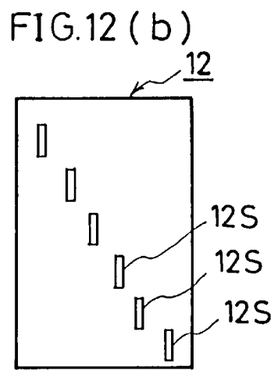
Figure 12C:
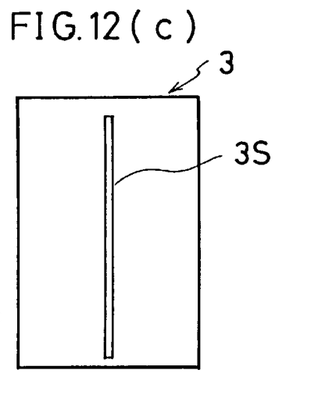

FIGS. 12(a), 12(b) and 12(c) are front views of the outer cylinder 4, the intermediate cylinder 12 and the inner cylinder 3 of the temperature distribution measuring instrument according to this Embodiment 2 of the present invention, respectively. As shown in FIG. 12(a), an n number of slits $4s$ ($4s_1, 4s_2, \ldots, 4s_n$ from the right end when seen from the object 5) are formed in the side portion of the outer cylinder 4 in parallel to the center axis. The number n of the slits 4s in the outer cylinder 4 is equal to the number of lateral divisions of the object 5. As shown in FIG. 12(b), five slits 12s (slits A to E) are formed in the side portion of the intermediate cylinder 12 in parallel to the center axis. The length of each of the slits 12s of the intermediate cylinder 12 is 1/m or less (m is the number of longitudinal divisions of the object 5) the length of each of the slits 4s of the outer cylinder 4, and the slits A to E are arranged obliquely downward from an upper portion to a lower portion of the side of the intermediate cylinder 12. The inner cylinder 3 has a single slit 3s in the side portion in a direction of the center axis as shown in FIG. 12(c).

The reason why the above-structured temperature distribution measuring instrument is more advantageous in improving resolution than the temperature distribution measuring instrument of the above Embodiment 1 will be described after the description of the operation of the instrument.

Figures 13A, 13B:
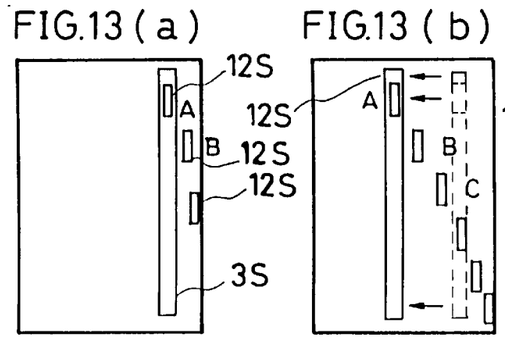
FIGS. 13(a) to 13(e) are diagrams showing the relationship between the inner cylinder and the intermediate cylinder according to Embodiment 2 of the present invention.

A description is subsequently given of the rotations of the inner cylinder 3 and the intermediate cylinder 12 of the temperature distribution measuring instrument 1 and the positional relationship between the slits of these cylinders with reference to FIGS. 13(a) to 13(e) and FIGS. 14(a) and 14(b). In FIGS. 13(a) to 13(e), the slits 4s of the outer cylinder 4 are omitted. As shown in FIG. 13(a), suppose that a slit A is aligned with the slit 3s of the inner cylinder 3. FIG. 14(a) is a top view of the temperature distribution measuring instrument 1 at that point. As is seen from the figure, the slit $4s_1$ of the outer cylinder 4, the slit A of the intermediate cylinder 12 is aligned with the slit 3s of the inner cylinder 3 and only infrared rays from the object 5 in a direction shown by an arrow in the figure (direction where the above slits are aligned with one another) are converged by the condenser lens 6 and input into the infrared sensor 9.

Figure 13C:
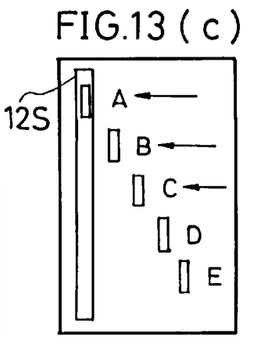
Figure 14A:
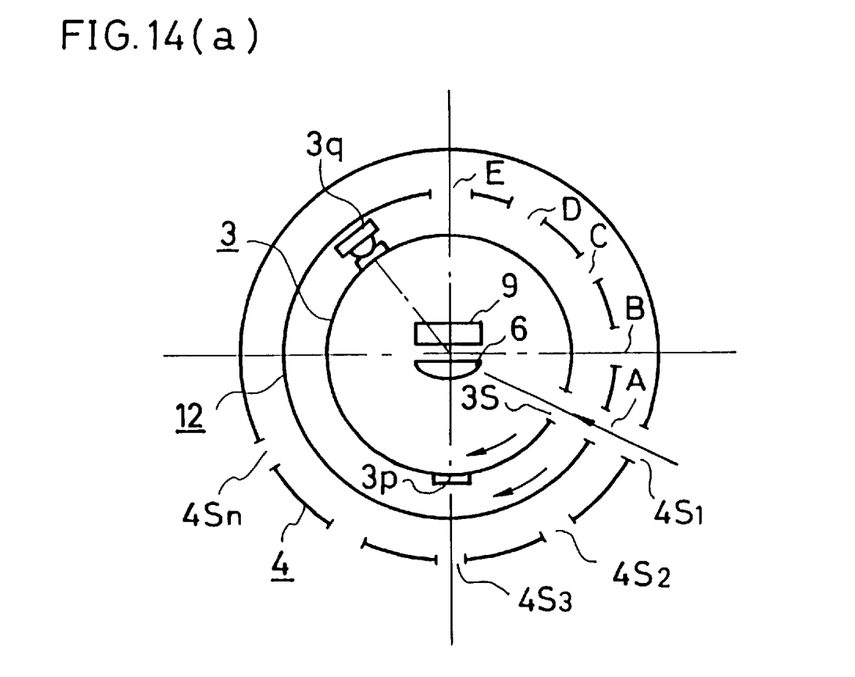
FIGS. 14(a) and 14(b) are diagrams showing the relationship among the inner cylinder, intermediate cylinder and outer cylinder according to Embodiment 2 of the present invention.

Thereafter, the inner cylinder 3 and the intermediate cylinder 12 rotate together clockwise while the slit A of the intermediate cylinder 12 is aligned with the slit 3s of the inner cylinder 3 as shown in FIGS. 13(b) and 13(c). At this point, infrared rays from the object 5 pass through the slits $4s_2, 4s_3, \ldots, 4s_n$ of the outer cylinder 4 and input into the infrared sensor 9 sequentially. Thus, a thermal image of a portion A of the object 5 is obtained.

Figure 13D:
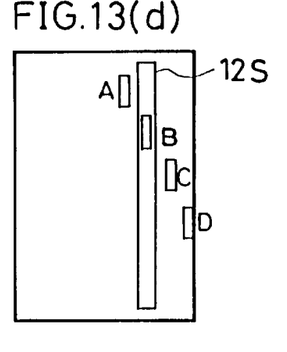
Figure 13E:
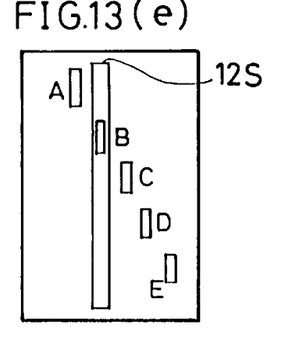
Figure 14B:
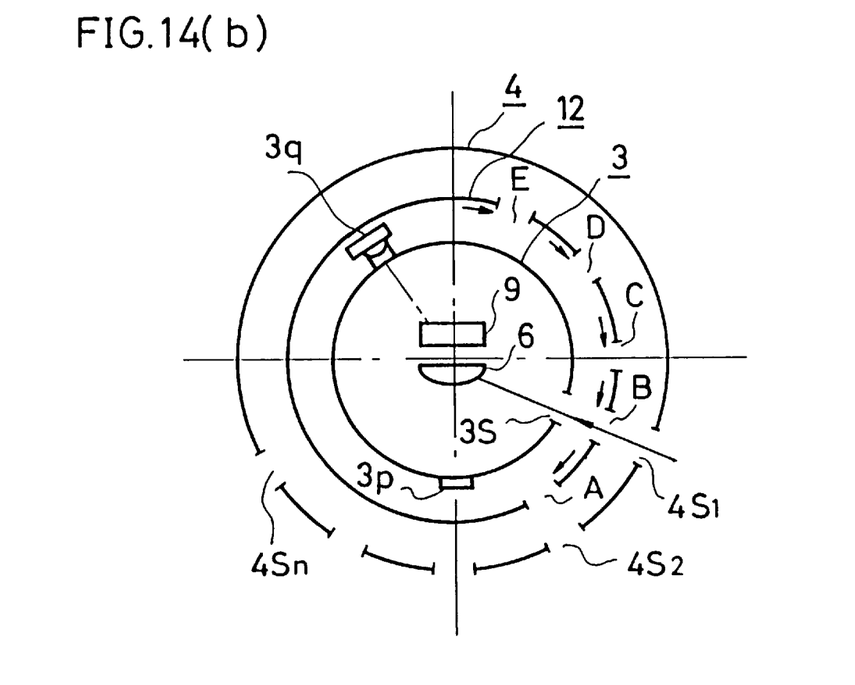

When the inner cylinder 3 and the intermediate cylinder 12 pass by the slits 4s of the outer cylinder 4 and make a half turn, the projection 3p of the inner cylinder 3 presses in the microswitch 3q like the above Embodiment 1, an intermediate cylinder position switch signal is sent from the microswitch 3q to the inner and outer cylinder drive means 11, and the intermediate cylinder 12 rotates at a predetermined angle independently of the inner cylinder 3 and reset in a such manner that the slit B comes to the initial position of the slit A (position where it is aligned with the slit $4s_1$ of the outer cylinder 4) as shown in FIG. 13(d) and FIG. 14(b). The inner cylinder 3 keeps rotating, and the inner and outer cylinder drive unit 11 controls the rotation of the intermediate cylinder 12 such that the inner cylinder 3 and the intermediate cylinder 12 rotate together when the slit 3s of the inner cylinder 3 comes to a position where three slits $4s_1$, B and 3s are aligned as shown in FIG. 13(d) and FIG. 14(b). The inner cylinder 3 and the intermediate cylinder 12 rotate together clockwise while the slit B is aligned with the slit 3s of the inner cylinder 3. Thus, thermal images of portions A to E of the object 5 can be obtained sequentially.

Figure 15A:
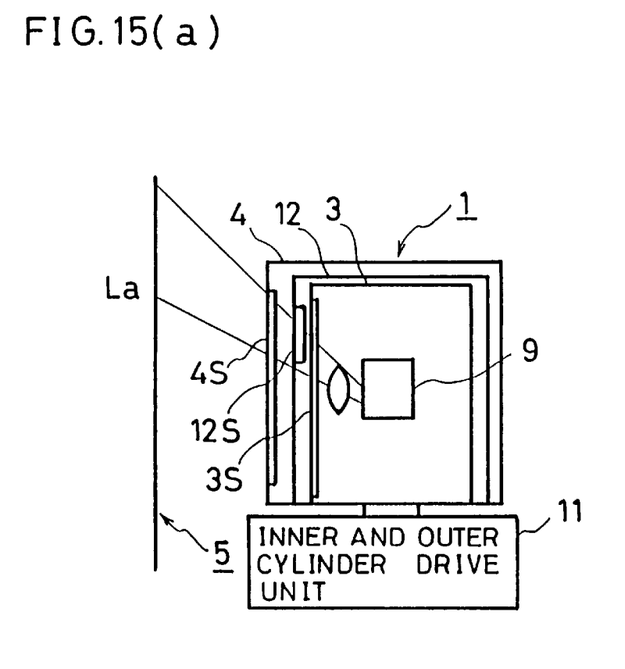
FIGS. 15(a) and 15(b) are diagrams showing the relationship between an object to be measured and slits in the intermediate cylinder according to Embodiment 2 of the present invention.
Figure 15B:
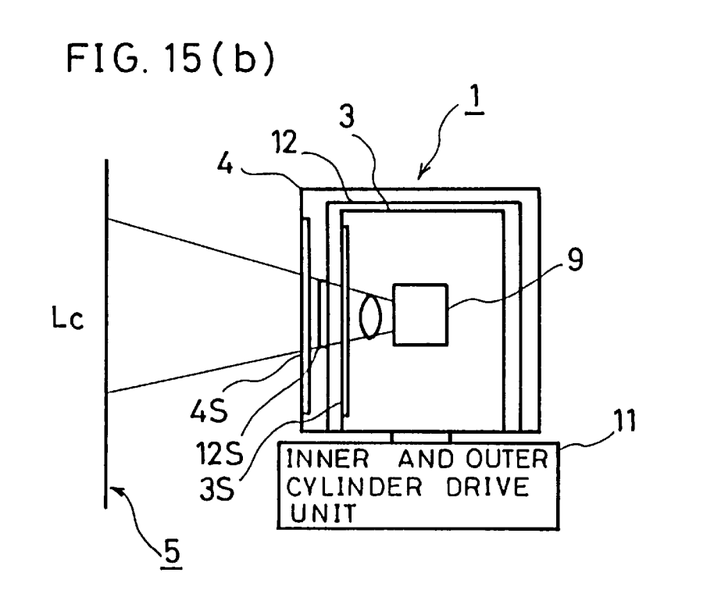

When the lengths of the slits A to E of the intermediate cylinder 12 are the same, the measurement ranges of the slits A to E differ from one another. FIGS. 15(a) and 15(b) show the measurement ranges of the slit C at a center portion of the intermediate cylinder 12 and the slit A at an upper portion of the intermediate cylinder 12, respectively. When the center of the slit A is located at an angle θ above the plane like the above Embodiment 1, the measurement range $L_a$ of the slit A is obtained by the equation $L_a=L_c/(\cos \theta)$ (Lc is a measurement range of the slit). Therefore, to keep the measurement ranges of the object 5 fixed irrespective of the incident angle θ, the length L of the slit 12s of the intermediate cylinder 12 at an angle θ from the center must satisfy the following equation.

$$L=L_c \cdot (\cos \theta)$$

The horizontal and vertical resolutions of a thermal image obtained by the temperature distribution measuring instrument 1 are determined by the number of longitudinal divisions and the number of lateral divisions of the object 5. In this Embodiment 2, the number of lateral divisions is equal to the number n of slits of the outer cylinder 4 and the number of longitudinal divisions is equal to the number m of slits of the intermediate cylinder 12. On the other hand, in the above Embodiment 1, the number of lateral divisions is equal to the number N of slits in each slit block of the outer cylinder 4 and the number of longitudinal divisions is equal to the number M of the slit blocks of the outer cylinder 4. Therefore, as is obvious from the development of the outer cylinder 4 of the Embodiment 1 shown in FIG. 4, to increase the numbers of horizontal and lateral divisions, the diameter of the outer cylinder 4 must be increased. However, as is evident by comparison between the development of the outer cylinder 4 of Embodiment 1 shown in FIG. 4 and the front view of the outer cylinder 4 of Embodiment 2 shown in FIG. 12, when the width and interval of the slits are fixed, the slit blocks corresponding to the number of longitudinal divisions must be arranged in Embodiment 1. Therefore, since the number of lateral divisions in Embodiment 1 is n=N×M, Embodiment 2 is much more advantageous than Embodiment 1 in terms of the number of lateral divisions. In Embodiment 2, the number of longitudinal divisions is determined only by the number m of the slits of the intermediate cylinder 12 and not affected by the number n of lateral divisions.

According to this embodiment of the present invention, a two-dimensional thermal image of the object 5 can be obtained using the single element type infrared sensor 9 and the resolution of the object 5 can be improved. Therefore, the temperature distribution measuring instrument can be further reduced in size.

In the temperature distribution measuring instrument 1 of the above Embodiment 2, the number of slits 3s of the inner cylinder 3 is one. The number of slits 3s of the inner cylinder 3 may be 2. In this case, the inner and outer cylinder drive unit is controlled such that the intermediate cylinder 12 and the inner cylinder 3 are rotated together at an angle of less than 180° and the intermediate cylinder 12 is moved to a predetermined position (position where the next slit is aligned with the slit $4s_1$ of the outer cylinder 4) before the second slit of the inner cylinder 3 moves to a position where it is aligned with the slit $4s_1$ of the outer cylinder 4.

Figure 16:
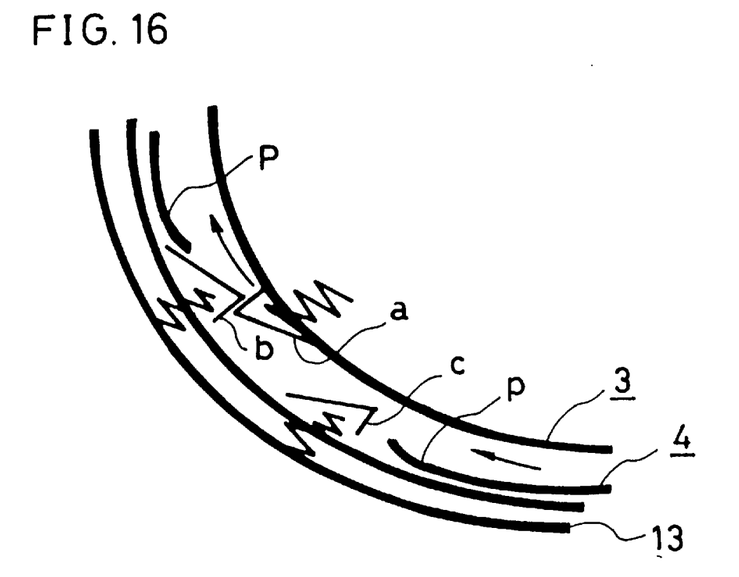
FIG. 16 is a diagram for explaining another example of a method of rotating the inner cylinder and the outer cylinder or intermediate cylinder together according to the above embodiments of the present invention.

In the above Embodiments 1 and 2, a signal indicative of the position of the inner cylinder 3 which is an electric signal is sent from the microswitch 3q to the inner and outer cylinder drive unit 11 to control the rotations of the inner cylinder 3, the intermediate cylinder 12 and the outer cylinder 4. As shown in FIG. 16, a ratchet unit may be provided between the inner cylinder 3 and the outer cylinder 4 (or the intermediate cylinder 12) so that when the inner cylinder 3 makes one turn, the outer cylinder 4 rotates by the interval between the slit blocks 10 (the intermediate cylinder 12 rotates by the interval between the slits of the intermediate cylinder 12). In FIG. 16, when the inner cylinder 3 rotates, the dog a of the inner cylinder 3 contacts the dog b of the outer cylinder 4 and the inner cylinder 3 and the outer cylinder 4 rotate together. However, when the dog b comes to the position of a press-in plate P, the dog b is pressed in by the press-in plate P, the connection between the inner cylinder 3 and the outer cylinder 4 is disconnected, and only the inner cylinder 3 keeps rotating. When the dog b is pressed in by the press-in plate P, other dog c rises, the dog a of the inner cylinder 3 which made one turn contacts the above dog c, and the inner cylinder 3 and the outer cylinder 4 rotate together again. In the figure, reference numeral 13 denotes a stopper for stopping the rotation of the outer cylinder 4.

As described above, according to the first aspect of the present invention, the temperature distribution measuring instrument comprises a single element type infrared sensor for detecting infrared rays from an object to be measured, an inner cylinder having a center axis parallel to the detection surface of the infrared sensor and two slits in the side portion and rotating around the infrared sensor, and a rotating outer cylinder arranged around the inner cylinder coaxially and having a plurality of slit blocks in the side portion, each consisting of a plurality of slits having a smaller length than the slits of the inner cylinder. Since the slit blocks of the outer cylinder are arranged at intervals of a predetermined angle and shifted from one another by a predetermined height in a direction of the length of the outer cylinder, and the inner cylinder and the outer cylinder are rotated together to converge at the infrared sensor infrared rays passing through a slit in the outer cylinder and a slit in the inner cylinder, a two-dimensional thermal image of the object can be obtained by the single element type infrared sensor. Therefore, the temperature distribution measuring instrument can be reduced in size.

According to the second aspect of the present invention, the temperature distribution measuring instrument comprises a single element type infrared sensor for detecting infrared rays from an object to be measured, an inner cylinder having a center axis parallel to the detection surface of the infrared sensor and a slit in the side portion and rotating around the infrared sensor, a rotating outer cylinder arranged around the inner cylinder coaxially and having a plurality of slits in the side portion, and an intermediate cylinder coaxial with the outer cylinder and the inner cylinder, arranged between the outer cylinder and the inner cylinder and having in the side portion a plurality of slits having a smaller length than the slits in the inner cylinder and the outer cylinder. Since the slits in the intermediate cylinder are arranged at intervals of a predetermined angle and shifted from one another by a predetermined height in a direction of the length of the intermediate cylinder, and the inner cylinder and the intermediate cylinder are rotated together to converge at the infrared sensor infrared rays passing through slits in the outer cylinder, the intermediate cylinder and the inner cylinder, the resolution of the object in a vertical direction can be further improved.

What is claimed is:

1. A temperature distribution measuring instrument comprising:

a single element type infrared sensor for detecting infrared rays from an object to be measured;

an inner cylinder having a center axis parallel to the detection surface of the infrared sensor and slits in the side portion and rotating around the infrared sensor; and a rotating outer cylinder arranged around the inner cylinder coaxially and having a plurality of slit blocks in the side portion, each consisting of a plurality of slits having a smaller length than the slits of the inner cylinder, wherein the slit blocks of the outer cylinder are arranged at intervals of a predetermined angle and shifted from one another by a predetermined height in a direction of the length of the outer cylinder, and the inner cylinder and the outer cylinder are rotated together to converge at the infrared sensor infrared rays passing through a slit in the outer cylinder and a slit in the inner cylinder.

2. A temperature distribution measuring instrument comprising:

a single element type infrared sensor for detecting infrared rays from an object to be measured;

an inner cylinder having a center axis parallel to the detection surface of the infrared sensor and a slit in the side portion and rotating around the infrared sensor;

a rotating outer cylinder arranged around the inner cylinder coaxially and having a plurality of slits in the side portion; and an intermediate cylinder coaxial with the outer cylinder and the inner cylinder, arranged between the outer cylinder and the inner cylinder, and having in the side portion a plurality of slits having a smaller length than the slits in the inner cylinder and the outer cylinder, wherein the slits in the intermediate cylinder are arranged at intervals of a predetermined angle and shifted from one another by a predetermined height in a direction of the length of the intermediate cylinder, and the inner cylinder and the intermediate cylinder are rotated together to converge at the infrared sensor infrared rays passing through slits in the outer cylinder, the intermediate cylinder and the inner cylinder.

* * * * *